United States Patent [19]

Breitman et al.

[11] Patent Number: 4,592,765
[45] Date of Patent: Jun. 3, 1986

[54] INERTIAL SEPARATOR

[75] Inventors: Daniel S. Breitman, Oakville; Ernest G. Dueck, Orangeville, both of Canada

[73] Assignee: Pratt & Whitney Canada Inc., Longueuil, Canada

[21] Appl. No.: 691,660

[22] Filed: Jan. 15, 1985

[51] Int. Cl.$^4$ .............................................. B01D 45/16
[52] U.S. Cl. .................................... 55/306; 55/385 B; 415/121 G
[58] Field of Search ............................ 55/306, 385 B; 60/39.092; 244/53 B; 415/121 G

[56] References Cited

U.S. PATENT DOCUMENTS

| | | | |
|---|---|---|---|
| 3,148,043 | 9/1964 | Richardson et al. | 55/306 |
| 3,436,910 | 4/1969 | Haworth | 415/121 G |
| 3,513,641 | 5/1970 | Hooper et al. | 55/306 |
| 3,977,811 | 8/1976 | Kuintzle | 415/121 G |
| 4,371,132 | 2/1983 | Woodward | 244/53 B |
| 4,509,962 | 4/1985 | Breitman | 55/306 |

Primary Examiner—Charles Hart
Attorney, Agent, or Firm—Schwartz, Jeffery, Schwaab, Mack, Blumenthal & Evans

[57] ABSTRACT

A particle separator for a gas turbine engine is described having an inlet passage to the compressor of the gas turbine engine, with the inlet passageway being defined by an inner wall and an outer wall. The inner wall diverges outwardly to form a throat with a diverging outer wall and converges inwardly downstream thereof. A first bypass opening is provided immediately upstream of the diverging inner wall, whereby solid and liquid particles can be diverted and passed overboard. A splitter ring is provided in the inlet passageway downstream of the converging inner wall, such that the finer particles escaping from the first bypass openings would be separated by the splitter ring.

1 Claim, 2 Drawing Figures

INERTIAL SEPARATOR

BACKGROUND OF THE INVENTION

1. Field of the Invention

The present invention relates to an inertial separator for separating foreign particles from an airflow, particularly to particle separation in inlet airflow to gas turbine engines.

2. Description of the Prior Art

The present invention is an improvement over United States application No. 539,748, filed Oct. 6, 1983. In this earlier application, there is described an airflow particle separator having an axis, the separator being provided for removing foreign particles and moisture from the airflow, the separator comprising an inner wall and an outer wall defining a passageway therebetween. The inner wall includes an inlet portion diverging in a downstream direction away from the separator axis and forms a throat with the outer wall to accelerate incoming air to a higher velocity in a substantially axial direction. The inner wall at the throat area includes a flow-turning portion, the flow-turning portion being defined to minimize boundary layer separation. The inner wall diverges from the outer wall downstream of the flow-turning portion.

Splitter means are disposed between the inner and outer walls, splitting the passageway into inner and outer passages with the outer passage adapted to accumulate moisture and foreign particles. The leading edge of the splitter means is located downstream and inward of the throat. The diverging inner wall upstream of the throat area provides a deflector surface such that as particles strike the deflecting inner wall, they will be focused in a predetermined bounce off the outer wall adjacent and downstream of the throat such that the particles will be bounced on top of and downstream of the splitter member into the bypass passage.

SUMMARY OF THE INVENTION

In addition to the particle and moisture separator herein described, a supplementary particle separator is provided upstream relative to the airflow and includes an opening in the inner wall upstream of the diverging portion of the inner wall. The diverging portion and the converging surface of the inner wall form an obstacle in the passage forcing the inlet airflow to turn first in a direction outwardly from the axis of the separator and then inwardly. The improvement is the provision of the opening immediately upstream of the diverging inner wall portion, the opening being provided with bypass ducting to overboard. It has been found that denser particles, such as sand or dust, will, because of the inertia in the airflow, move directly downstream into the opening and into the bypass ducting rather than move through the passageway around the obstacle. The airflow, which is forced to move about the obstacle and which may still contain fine particles, is subjected to further separation by means of the further turn in the passageway towards the axis of the separator, forcing the particles to bounce off the outer wall, which will cause the particles to be bounced on top of and downstream of a splitter means in the passage, all as previously described in United States patent application Ser. No. 539,748, filed Oct. 6, 1983.

In a more specific embodiment of the present invention, the outer and inner walls forming the airflow passage have a circular cross-section, and the cross-section, therefore, of the passageway is an annulus. The inner wall of the airflow passageway includes a section of increased diameter providing a suddenly diverging surface followed by a converging surface in the throat area of the passageway. An annular bypass flow opening is defined immediately upstream of the diverging surface of the inner wall, such that the inertia of the airflow and particles in the airflow in the intake of the engine flow through the bypass flow opening. The outer wall of the passage incudes a slightly increased diameter in the area of the throat and defines a deflecting portion opposite to the maximum diameter of the inner wall at the throat and then converges downstream. A splitter means is provided in the passageway downstream of the throat section of the inner wall such that the particles not removed from the airflow by means of the bypass flow opening upstream of the increased diameter section of the inner wall will be bounced off the outer wall as a result of the change in direction of the airflow and will rebound outwardly of the splitter means and downstream of the leading edge of the splitter means.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
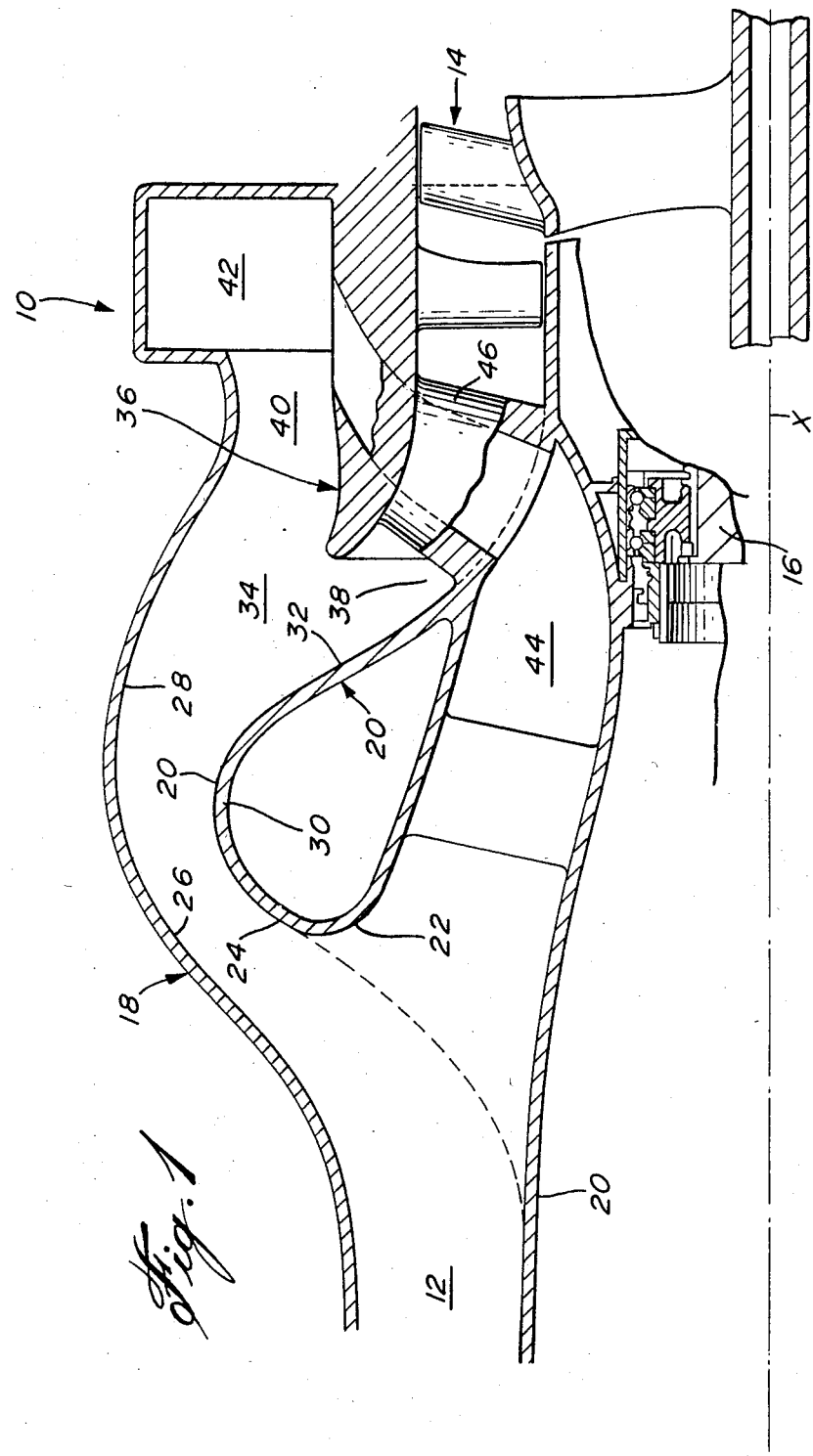
FIG. 1 is a fragmentary axial cross-section of a typical gas turbine engine equipped with an inlet particle separtor of the present invention.

Referring now to the drawings, there is shown a gas turbine engine 10 having an inlet 12, a compressor 14 and a shaft 16.

The inlet 12 includes an airflow separator for separating solid and liquid particles from the airflow which is destined for the compressor and the engine. The various elements shown in FIG. 1 are symmetrical about an axis X, and the inlet is in the form of an annulus about the axis X. Thus, only a portion of the inlet and compressor is shown in the drawing. The inlet 12, therefore, includes an outer wall 18 and an inner wall 20. An annular opening is formed in the inner wall 20 which provides a first airflow bypass. The inner wall 20 diverges outwardly at 24 relative to the axis X, while the outer wall has a corresponding diverging surface 26 which leads into a deflecting section. The deflecting section is identified by the numeral 28.

The inner wall 20 has a point of maximum diameter at the apex 30 defining a constricted throat with the outer wall 18 in the area of the deflecting section 28 in order to increase the velocity of the airflow therethrough. The inner wall 20 converges inwardly towards the axis X immediately past the apex 30, and this converging surface is identified by the numeral 32. The converging section 32 and the outer wall 18 define a passageway 34 which is divided by splitter ring 36, splitting the passage 34 into a core passage 38 and a bypass 40. The bypass 40 communicates with a collecting shroud 42.

The first bypass opening 22 communicates with a bypass passageway 44 which in turn communicates with hollow struts 46. There may be six such struts spaced radially about the axis X and interrupting the core passage 38. The conduit formed by the hollow struts 46 communicates eventually with the collector shroud 42.

Thus, as can be seen, the airflow, before reaching the compressor, is subject to two tight reverse turns. In each of the turns, the inertia of the fast-moving solid or liqid particles causes the particles to continue in a straight line. For instance, the larger particles will pass through the bypass opening 22 into the bypass 44 through the hollow struts 46 and into the collecting shroud 42.

The dust or fine sand, which may have continued in the airflow downstream of the bypass opening 22, will be forced to converge inwardly into the passageway 34, causing the remaining particles to collect in bypass 40 or to bounce off the deflecting section 28 of the outer wall 18. As in United States patent application Ser. No. 539,748, the position of the splitter ring 36 in relation to the passageway 34 and the diameter thereof in relation to the diameter of the apex 30 is chosen such that the deflecting or rebounding particles will exit through the bypass 40, by rebounding on the outer surface of the splitter ring 36.

Figure 2:
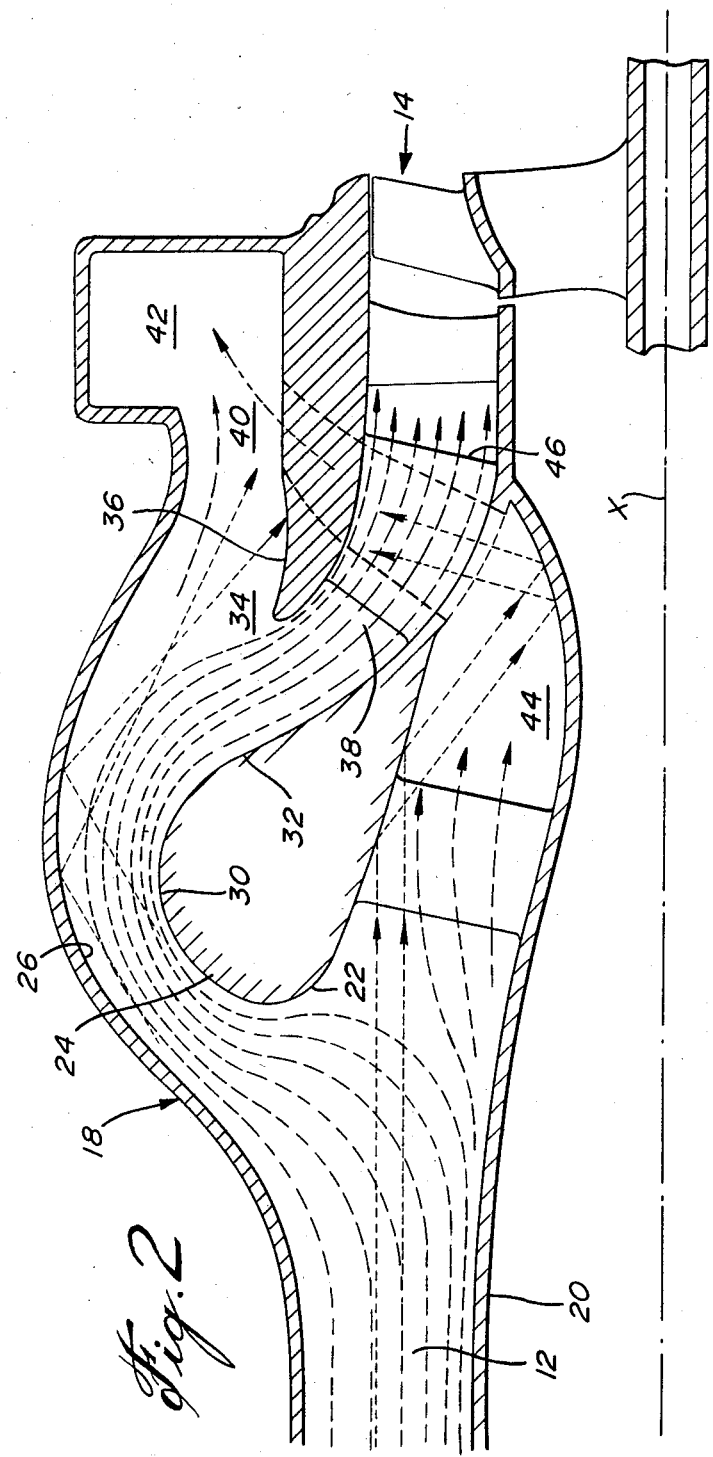
FIG. 2 is a schematic view showing the inlet separator incorporating the features of the present invention.

In FIG. 2, the airflow is illustrated in comparison with the particles which are being separated from the airflow.

We claim:

1. In a gas turbine engine compressor inlet, an airflow particle separator having an axis, the inlet having an inner wall and an outer wall of circular cross-section respectively defining an axial annular passageway, said inner wall including an inner wall portion diverging in a downstream direction away from the separator axis, a bypass opening defined in the inner wall immediately upstream of the diverging wall portion, the bypass opening communicating with a bypass conduit which in turn communicates with a collector shroud adapted to dump said particles outboard, the inner and outer walls forming a throat in the area of maximum divergence of the inner wall, the inner wall converging downstream of the throat area towards the axis of the separator, a splitter ring provided in the passageway between the inner wall and the outer wall downstream of the throat to form a core passage and a bypass passage, the bypass passage communicating with said collector shroud whereby the inertia of the particles in the airflow will tend to cause the particles to pass through the bypass opening immediately upstream of the diverging inner wall and the remaining particles in the airflow being deflected through the bypass passage at the splitter ring.

* * * * *